United States Patent
Abdulgadir et al.

(10) Patent No.: US 12,118,098 B1
(45) Date of Patent: Oct. 15, 2024

(54) COMPUTER PROCESSING SYSTEM AND METHOD CONFIGURED TO EFFECTUATE LOWER-ORDER MASKING IN A HIGHER-ORDER MASKED DESIGN

(71) Applicant: PQSECURE TECHNOLOGIES, LLC, Boca Raton, FL (US)

(72) Inventors: Abubakr Abdulgadir, Reston, VA (US); Rami ElKhatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 18/702,684

(22) PCT Filed: Dec. 8, 2023

(86) PCT No.: PCT/US2023/083123
§ 371 (c)(1),
(2) Date: Apr. 18, 2024

(51) Int. Cl.
G06F 21/60 (2013.01)
G06F 7/76 (2006.01)

(52) U.S. Cl.
CPC ............ G06F 21/602 (2013.01); G06F 7/764 (2013.01)

(58) Field of Classification Search
CPC ................................ G06F 21/602; G06F 7/764
See application file for complete search history.

(56) References Cited

U.S. PATENT DOCUMENTS

| | | | | |
|---|---|---|---|---|
| 8,958,510 B1 * | 2/2015 | Harris | ................ | H03H 17/0294 |
| | | | | 375/350 |
| 10,083,310 B1 * | 9/2018 | Lampkins | ............. | H04L 9/3093 |
| 10,740,474 B1 * | 8/2020 | Ghetti | .................. | H04L 9/3066 |
| 11,461,481 B1 * | 10/2022 | Gounares | .................. | H04L 9/14 |
| 11,496,288 B1 * | 11/2022 | Soltani | .................. | G06F 21/602 |
| 11,853,449 B1 * | 12/2023 | Fu | .......................... | G06F 21/602 |
| 2003/0120941 A1 * | 6/2003 | Bae | ..................... | G06F 12/1408 |
| | | | | 713/193 |
| 2003/0135530 A1 | 7/2003 | Parthasarathy | | |

(Continued)

FOREIGN PATENT DOCUMENTS

WO 2021051376 A1 3/2021

OTHER PUBLICATIONS

Gross et al., "Domain-Oriented Masking; Compact Masked Hardware implementations with Arbitrary Protection Order." In: TiS '16: Proceedings of the 2016 ACM Workshop on Theory of implementation Security, Oct. 2016, [online] [retrieved on Feb. 13, 2024 (Feb. 13, 2024)] Retrieved from the internet < URL: https7/di.acm.org doi/10.1145/2996366.2996426 >, entire document.

Primary Examiner — Aravind K Moorthy
(74) Attorney, Agent, or Firm — Mark C. Johnson; Johnson|Dalal

(57) ABSTRACT

A computer processing system configured to effectuate lower-order masking in a higher-order masked design that includes a DOM Multiplication gate of order M operably configured to receive M+1 data shares for each of a plurality of variables and operably configured to perform a lower order masking of N. As used herein, M is greater than N, by disabling at least one cross-domain computation of the M+1 data shares between N+1 data shares and M−N data shares. To that end, the system and method of effectuating lower-ordered masking in a higher-order masked design beneficially by being operable to disable cross-domain computations to perform the lower-order masked operations.

12 Claims, 5 Drawing Sheets

(56) References Cited

U.S. PATENT DOCUMENTS

| | | | |
|---|---|---|---|
| 2006/0117079 A1* | 6/2006 | Lin | G06F 7/726 708/492 |
| 2010/0134541 A1 | 6/2010 | Walmsley | |
| 2010/0150350 A1* | 6/2010 | Reidenbach | H04L 9/0631 380/29 |
| 2011/0110525 A1* | 5/2011 | Gentry | H04L 9/14 380/285 |
| 2011/0211692 A1* | 9/2011 | Raykova | H04L 9/008 380/46 |
| 2012/0213359 A1* | 8/2012 | Troncoso Pastoriza | H04L 9/008 380/28 |
| 2016/0004874 A1* | 1/2016 | Ioannidis | H04L 9/302 713/165 |
| 2018/0131512 A1* | 5/2018 | Gajek | H04L 9/0866 |
| 2019/0121837 A1* | 4/2019 | Azizi | G06F 9/30036 |
| 2019/0379529 A1* | 12/2019 | Meyer | H04L 9/008 |
| 2020/0007338 A1* | 1/2020 | Oh | H04L 9/0866 |
| 2020/0026883 A1* | 1/2020 | de Almeida | H04L 9/0637 |
| 2020/0110907 A1 | 4/2020 | Jaffe | |
| 2020/0134204 A1* | 4/2020 | Furukawa | G06F 21/64 |
| 2020/0266970 A1* | 8/2020 | Rietman | G06F 7/764 |
| 2021/0248245 A1* | 8/2021 | Imabayashi | H04L 9/0825 |
| 2022/0045851 A1* | 2/2022 | Krishnamoorthy | H04L 9/008 |
| 2022/0066950 A1* | 3/2022 | Wang | G06F 21/602 |
| 2022/0094519 A1* | 3/2022 | Jeljeli | H04L 9/088 |
| 2022/0100468 A1 | 3/2022 | Alibaba | |
| 2022/0150048 A1* | 5/2022 | Parulan | H04L 9/008 |
| 2022/0198034 A1* | 6/2022 | Rodriguez | H04L 9/30 |
| 2022/0255720 A1* | 8/2022 | Sehrawat | H04L 9/14 |
| 2022/0286285 A1* | 9/2022 | Biran | H04L 9/008 |
| 2022/0309314 A1* | 9/2022 | Park | G06N 3/04 |
| 2022/0337392 A1* | 10/2022 | Schauer | H04L 9/3247 |
| 2022/0385448 A1* | 12/2022 | Honorio Araujo da Silva | H04L 9/14 |
| 2023/0027423 A1* | 1/2023 | Rao | G06F 7/5443 |
| 2023/0168825 A1* | 6/2023 | Agrawal | G06F 3/0659 711/163 |
| 2023/0239149 A1* | 7/2023 | Liu | H04L 9/085 713/189 |
| 2023/0259638 A1* | 8/2023 | Yang | G06F 21/755 726/26 |
| 2023/0367886 A1* | 11/2023 | Barnett | G06F 16/116 |
| 2024/0048353 A1* | 2/2024 | Hoshizuki | H04L 9/3093 |
| 2024/0169074 A1* | 5/2024 | Leung | G06F 21/53 |
| 2024/0267222 A1* | 8/2024 | Chillotti | H04L 9/3093 |

\* cited by examiner

COMPUTER PROCESSING SYSTEM AND METHOD CONFIGURED TO EFFECTUATE LOWER-ORDER MASKING IN A HIGHER-ORDER MASKED DESIGN

FIELD OF THE INVENTION

The present invention relates to computer processing systems and methods, specifically to systems and methods for effectuating lower-order masking in a higher-order masked design.

BACKGROUND OF THE INVENTION

At the heart of modern cryptography lies the art of ensuring security through complex mathematical problems. These problems are strategically structured such that, with our current technological prowess, they remain extremely challenging to unravel. In practice, a system implementing a cryptographic algorithm often harnesses straightforward mathematical processes to transform private, secret data into public, openly accessible data. What makes these algorithms secure is the intrinsic difficulty in reversing this transformation, i.e., extracting the original private data from the public data. This reverse process represents the formidable mathematical hurdle that potential adversaries must overcome.

However, cryptographic algorithms, when put into practice, are not without vulnerabilities. The very act of a system processing these mathematical operations can inadvertently betray sensitive clues. Power consumption patterns and the timing of computations can become inadvertent channels of information leakage.

One particularly potent form of attack that exploits such vulnerabilities is differential power analysis (DPA). By analyzing the differences in power consumption traces of cryptographic processes, DPA can extract significant information about the underlying operations and data. To shield systems from such "prying eyes," protective measures have been conceived, and one common technique is known as "masking." By obfuscating both the input data and the associated operations, masking attempts to render power analysis futile. A prime example in the world of masking is the utilization of the domain-oriented masking (DOM), see, for example, Gross et al., Domain-Oriented Masking: Compact Masked Hardware Implementations with Arbitrary Protection Order, available at https://eprint.iacr.org/2016/486.pdf, wherein DOM can be utilized in a system that performs a multiplication operation.

However, attackers have progressively refined their techniques. While initial DPA attacks, termed "first-order," focused on singular points in the power trace, subsequent, more sophisticated "second-order" (and even higher-order) DPA attacks analyze multiple points simultaneously, extracting deeper insights from the system's power consumption patterns. Naturally, these advanced attack strategies necessitate equally advanced countermeasures.

But advancing these advanced countermeasures are not without their trade-offs. Higher-order countermeasures often demand more from the system, e.g., increased power consumption, expanded silicon area, and potentially reduced performance. It is also essential to acknowledge that not all segments of a cryptographic algorithm are equally vulnerable or critical. Some portions might operate exclusively on public data, making the deployment of high-order countermeasures redundant for these sections. In such scenarios, it becomes invaluable to embed lower-order masking techniques within a predominantly higher-order masked design. This selective approach can optimize power efficiency and potentially enhance system performance, ensuring robust security without undue resource expenditure.

Therefore, a need exists to overcome the problems with the prior art as discussed above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

SUMMARY OF THE INVENTION

Figure 1:
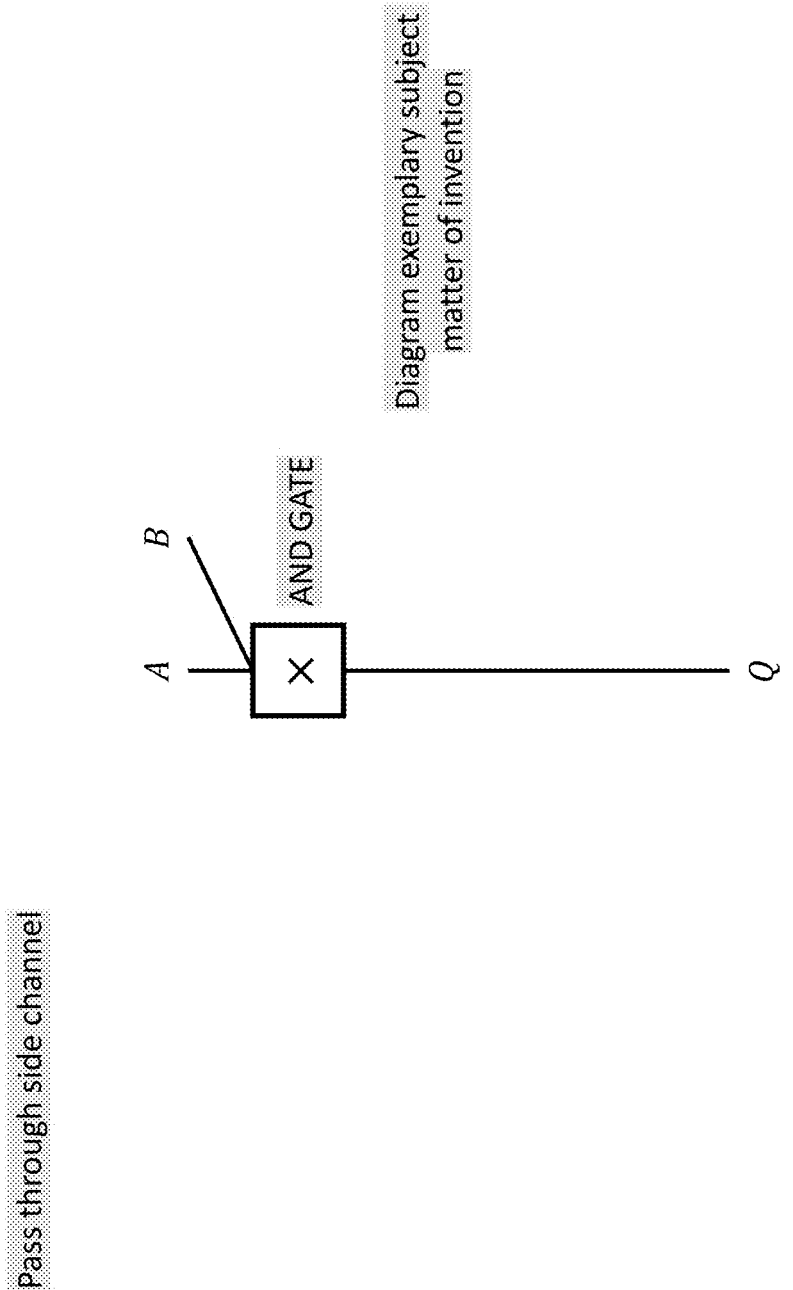
FIG. 1 is a diagram representing the basic operation of A×B (or multiplication gate), devoid of any side-channel protective measures, i.e., a unprotected side channel in accordance with the prior known art.

The present invention provides a computer processing system and method configured to effectuate lower-order masking in a higher-order masked design. The proposed method utilizes disabling cross-domain computations to perform the lower-order masked operations.

With the foregoing and other objects in view, there is provided, in accordance with the invention, a computer processing system containing a DOM Multiplication gate of specific order M>1.

In one embodiment of the present invention, the process may include disabling some cross-domain computation to perform lower-order multiplication within a higher-order DOM Multiplication gate.

In one embodiment of the present invention, the process may include zeroing out data share inputs and completely random data to disable the some cross-domain computation.

In yet another embodiment of the present invention, the process may include disabling internal gates to disable the some cross-domain computation.

In one embodiment of the present invention, the process may include performing several lower-order multiplications concurrently within a higher-order DOM Multiplication gate.

In a further embodiment of the present invention, the process may include performing a zero-order multiplication (also referred to as "unprotected multiplication") inside a higher-order DOM Multiplication gate. In an additional embodiment of the present invention, the computer processing system may perform the hashing algorithm Keccak, SHA-3 or its derivatives.

Additionally, the present invention discloses a computer processing system and method configured to effectuate lower-order masking in a higher-order masked design by utilizing a DOM Multiplication gate of order M operably configured to receive M+1 data shares for each of a plurality of variables and operably configured to perform a lower order masking of N, wherein N<M, by disabling at least one cross-domain computation of the M+1 data shares between N+1 data shares and M−N data shares.

In accordance with another feature, an embodiment of the present invention includes disabling by zeroing out input of the M−N data shares and zeroing out any completely random data input in the cross-domain computation between N+1 data shares and M−N data shares within the DOM Multiplication gate.

In accordance with yet another feature, an embodiment of the present invention includes disabling by having the internal gates configured to perform the at least one cross-domain computation of the M+1 data shares between N+1 data shares and M−N data shares.

In accordance with a further feature of the present invention, the DOM Multiplication gate of the order M is operably configured to perform k lower order maskings of N0, N1, N2, . . . , Nk in parallel such that M+1≥(L+1)=(N0+1)+(N1+1)+(N2+1)+ . . . +(Nk+1) by disabling internal gates configured to perform the at least one cross-domain computation of the M+1 data shares between each of (N0+1), (N1+1), (N2+1), . . . , (Nk+1) and M−L data shares.

In accordance with an additional feature of the present invention, N=0 and the computer processing system is configured to perform SHA-3, Keccak, or their respective derivatives.

Also in accordance with the present invention, a computer-implemented method for performing lower-order masking in a higher-order masked design is disclosed that includes the steps of performing DOM Multiplication operation of order N inside a DOM Multiplication operation of order M inside a computer system and disabling at least one cross-domain computation of the M+1 data shares between N+1 data shares and M−N data shares in the DOM Multiplication operation of order M.

In accordance with another feature, an embodiment of the present invention includes disabling at least one cross-domain computation of the M+1 data shares between N+1 data shares and M−N data shares by zeroing out input of the M−N data shares and zeroing out any completely random data input in the cross-domain computation between N+1 data shares and M−N data shares within the DOM Multiplication operation.

In accordance with an exemplary feature, an embodiment of the present invention also includes disabling at least one cross-domain computation of the M+1 data shares between N+1 data shares and M−N data shares by disabling internal gates configured to perform the at least one cross-domain computation of the M+1 data shares between N+1 data shares and M−N data shares.

In accordance with yet another feature, an embodiment of the present invention includes performing k DOM Multiplication operations of order N0, N1, N2, . . . , Nk in parallel such that M+1≥(L+1)=(N0+1)+(N1+1)+(N2+1)+ . . . +(Nk+1) by disabling internal gates configured to perform the at least one cross-domain computation of the M+1 data shares between each of (N0+1), (N1+1), (N2+1), . . . , (Nk+1) and M−L data shares.

In accordance with another feature, an embodiment of the present invention includes performing SHA-3, Keccak, or their respective derivatives in the computer system.

Although the invention is illustrated and described herein as embodied in a computer processing system and method for performing lower-order masking in a higher order masked design, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

In the development and description of the present invention, various concepts, notations, and methodologies from mathematics, engineering, and cryptography are integrated. Standard concepts in these domains will be referenced without comprehensive elaboration. For the present invention, data is defined as n-sized bits in a computer processing system, with "n" being an integer greater than 0.

Within this framework, data is represented in the binary Galois Field, denoted as $GF(2^n)$. The methods to execute $GF(2^n)$ multiplication and addition operations on data are well-documented. A $GF(2^n)$ Multiplication gate is symbolized by a box with the multiplication symbol (x), accepting two inputs and yielding one output. Conversely, a $GF(2^n)$ Addition gate is denoted by a box with an addition symbol (+), consuming two data inputs to produce one data output. Professionals in the domain can physically implement both boxes within a computer processing system.

For the case when n=1, the $GF(2^n)$ Multiplication gate simplifies to a singular AND gate, and the $GF(2^n)$ addition gate to an XOR gate. While the term '$GF(2^n)$' in the specification might occasionally be excluded for brevity, all operations should be understood to occur in $GF(2^n)$.

The term "original data" refers to data untouched by any side-channel countermeasures. To apply a DPA countermeasure of order M, the original data is split into M+1 data shares. For instance, if the original data is A, it is represented by data shares $A_0, A_1, A_2, \ldots, A_M$. The sum of these data shares yields the original data: $A=A_0+A_1+\ldots+A_M$. In other words, each element among $A_0, A_1, A_2, \ldots, A_M$ is a data share of the original data A, collectively representing it.

For an order M=0 scenario, the solitary data share $A_0$ equates to the original data A. Here, the design lacks any side-channel countermeasure. With reference to FIG. 1, a Multiplication gate is depicted accepting data inputs A and B to generate output Q. This representation elucidates multiplication in the absence of side-channel countermeasures. Given the singular data share, it is termed zero-order multiplication.

The transition between the original data and its share representation is not detailed in this invention, as this transition typically precedes or follows the processes illustrated. This conversion, colloquially termed "sharing," randomizes data shares while ensuring their cumulative sum remains consistent with the original data. It is also established that data shares can be re-randomized, provided the sum of these new shares corresponds to the original data. This procedure is known as "resharing."

In various embodiments of the invention, certain modifications, including but not limited to "resharing," can be implemented. Such modifications, even if superficially distinct, are considered to be within the scope and spirit of the present invention. The act of "resharing" or any similar alteration does not depart from the fundamental principles and innovative features described herein.

Within this invention's scope, however, data shares labeled with identical subscript numbers exist in the same domain. In contrast, those with distinct subscript numbers belong to different domains. Consider data A represented by shares $A_0, A_1, A_2, \ldots, A_M$ and data B represented as $B_0, B_1, B_2, \ldots, B_M$. For any given $0 \leq i \leq M$ and $0 \leq j \leq M$, $A_i$ and $B_j$ share the same domain if i=j, but different domain if i≠j. Operations on shares within the same domain are termed inner-domain operations, while those spanning different domains are called cross-domain operations.

When executing a cross-domain operation, it is routine to reshare the output before its amalgamation with a share, rendering the cross-domain operation independent of any specific share. This resharing involves supplementing the cross-domain operation by adding random data, which can originate either externally or from independent data within the processing system.

Typically, to negate glitches, reshared outputs are stored in a memory unit. For the purpose of the present invention, a memory unit denotes a structural storage segment retaining data for a specified duration within a computer processing system. Accompanying diagrams symbolize these with boxes marked "FF," standing for flip-flop. The memory units portrayed in these figures signify the minimum required design to avert glitches. To synchronize data, some designs might introduce supplementary memory units.

Therefore, in various embodiments of the invention, certain modifications, including but not limited to, introducing additional memory units, can be implemented. Such modifications, even if superficially distinct, are considered to be within the scope and spirit of the present invention. The act of introducing additional memory units or any similar alteration does not depart from the fundamental principles and innovative features described herein.

Figure 2:
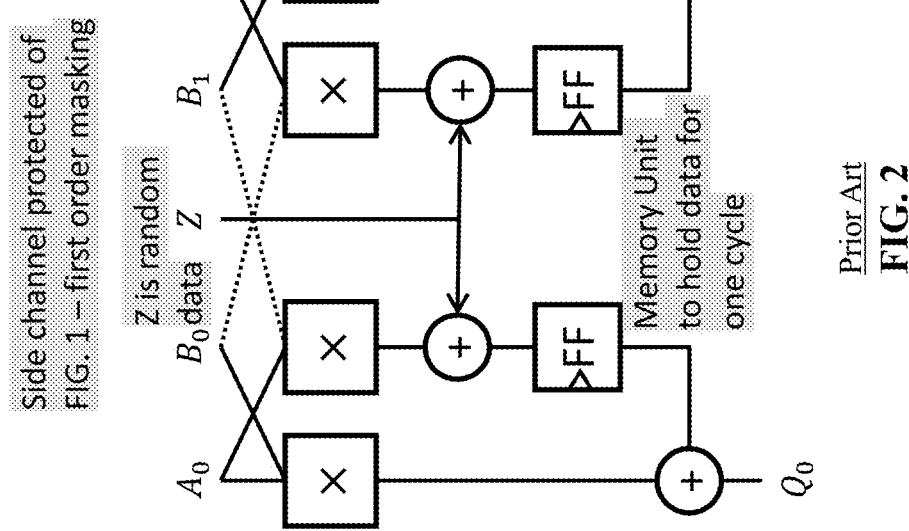
FIG. 2 is a diagram depicting the state-of-the-art or prior art M'th order DOM multiplication gate.

In the context of this invention, the DOM Multiplication gate of order M signifies a gate equipped to execute multiplication with a DPA countermeasure of order M. FIG. 2 illustrates the DOM Multiplication, operating on inputs A (represented by $A_0, A_1, A_2, \ldots, A_M$) and B (represented by $B_0, B_1, B_2, \ldots, B_M$) to generate output Q (represented by $Q_0, Q_1, Q_2, \ldots, Q_M$). Specifically, the DOM Multiplication gate generates $$Q_i = A_i \times B_i + \sum_{j \neq i}^{M} A_i \times B_j + Z_{i,j} \text{ for all } 0 \leq i \leq M.$$

Here, $A_i \times B_i$ constitutes an inner-domain multiplication operation and each $A_i \times B_j$ comprises a cross-domain multiplication operation. $Z_{i,j}$, on the other hand, represents the random data added to the cross-domain multiplication operation to generate the reshared multiplication output. To prevent glitching, as previously mentioned, a memory unit is integrated post the reshared cross-domain multiplication. Subsequently, the output from these memory units is combined with the inner-domain operation, producing the side-channel protected multiplication data share output, $Q_i$.

A DOM Multiplication gate of order 0 is reduced to the zero-order Multiplication gate as illustrated in FIG. 1. A significant attribute of the DOM Multiplication gate is its inherent symmetry, evident in both its design and the mechanics of its operation. While there is a delineated sequence provided for utmost clarity, those seasoned in this domain will discern that the order of both the components and steps can be altered, thanks to the gate's symmetrical nature. These variations, however, do not distort the core characteristics of the DOM Multiplication gate and remain within the confines of this disclosure.

There are multifaceted methods to approach the resharing operation within cross-domain computation. One such method employs completely random data that remains unrelated to the algorithm in execution by the computer processing system. In such an instance, it becomes imperative for all the random data $Z_{i,j}$ utilized by the DOM Multiplication, to be selected in a manner such that $$\sum_{i=0}^{M}\sum_{j\neq i}^{M} Z_{i,j} = 0.$$

A trivial approach to achieving this involves setting $Z_{i,j}=Z_{j,i}$, ensuring their mutual nullification.

Another notable approach is applicable if there is a subsequent addition operation to the multiplication within the algorithm being processed, coupled with the condition that the inputs remain independent. For illustration, consider an algorithmic operation resembling (A×B)+C, where A, B, and C are independent original datas. With a masked design order of M, and akin to A and B, C is represented by data shares $C_0, C_1, C_2, \ldots, C_M$. These data shares of C, derived from the sharing process, are intrinsically random. As such, they can directly replace the completely random data $Z_{i,j}$, eliminating the need for mutual nullification since they naturally align with the algorithm. In situations where there is a shortage of independent data shares, the subsequent resharing operations can lean on completely random data, ensuring they negate each other.

Within this disclosure's ambit, two distinct methods have been discussed for resharing within a cross-domain computation. Yet, it is paramount to understand that any derivations, modifications, or slight tweaks to these methods continue to resonate with the spirit and scope of this invention. The core innovation remains undisturbed, irrespective of the resharing within the cross-domain technique employed.

In the context of this invention, elements illustrated as shaded in FIG. 2 are termed as cross-domain computations. Specifically, a single continuous path that combines a multiplication of $A_i \times B_j$, a resharing (a.k.a. adding $Z_{i,j}$), and a memory unit denotes one cross-domain computation. In this context, the multiplication, the resharing addition, and the memory unit are considered as the internal gates of the cross-domain computation. If resharing is inherently a part of the algorithm, then only the multiplication of $A_i \times B_j$ is defined as a cross-domain computation.

The DOM AND gate emerges as a unique instance of the DOM Multiplication gate. In this variant, multiplication gates are replaced with AND gates, symbolizing GF(21) operations.

The present invention introduces a computer processing system and a method that facilitates lower-order masking within a higher-order masked design that uses DOM Multiplication. For simplicity, it is assumed that the lower-order masking employs the data shares with the lowest subscript values from the higher-order masked design.

A DOM Multiplication of order M can perform a DOM Multiplication operation of order N<M, by disabling certain cross-domain computations among the N+1 data shares used by the order N operation. Specifically, the targeted cross-domain computations to be deactivated must satisfy the condition that the $$\sum_{j=N+1}^{M} A_i \times B_j + Z_{i,j} = 0$$

for all data shares i=0, 1, 2, . . . , N. In other words, all cross-domain computations of $A_i \times B_j + Z_{i,j}$ between N+1 data shares i=0, 1, 2, . . . , N and M−N data shares j=N+1, N+2, . . . , M should be made zero. If $Z_{i,j}$ uses data that is essential to the algorithm, then only $A_i \times B_j$ needs to be zeroed.

Multiple techniques can zero out the cross-domain computation. One approach is to set the inputs of the M−N data shares N+1, N+2, . . . , M and any completely random data in the cross-domain computation between the N+1 data shares 0, 1, 2, . . . , N and N−M data shares N+1, N+2, . . . , M to zero. Consequently, with $B_j=0$ and Z=0, the result is that $A_i \times B_j + Z_{i,j}$, for i=0, 1, 2, . . . , N and j=N+1, N+2, . . . , M. If $Z_{i,j}$ uses data that is not completely random (i.e., is part of the algorithm), it remains unchanged.

Another approach involves disabling the internal gates of those cross-domain computations slated for nullification. This achieves the same outcome of $A_i \times B_j + Z_{i,j}$ for i=0, 1, 2, . . . , N and j=N+1, N+2, . . . , M. The internal gates, which include the multiplication, the resharing addition, and the memory unit, should be disabled in such a way that the memory unit outputs a value of zero. If $Z_{i,j}$ contains algorithm-specific data, then only the multiplication gate requires disabling to ensure its output is zero.

In engineering terms, disabling an internal gate is a known technique. Experts in the field understand several techniques to achieve this, like using a reset signal for a memory unit to make its output zero, or deploying a multiplexer to select between inputs, where one can be zero. Incorporating these standard mechanisms in this invention neither diminishes its novelty nor its innovative essence. They serve foundational or complementary roles to the unique components of this invention.

Upon deactivating the internal gates of the cross-domain computation between i=0, 1, 2, . . . N and j=N+1, N+2, . . . , M, data shares 0, 1, 2, . . . , N can be utilized to perform DOM Multiplication operation of order N. Simultaneously, by deactivating the internal gates of the cross-domain computation between i=N+1, N+2, . . . , M and j=0, 1, 2, . . . N, data shares N+1, N+2, . . . , M can be used to perform a DOM Multiplication operation of order M−N−1. This approach allows two DOM Multiplication operations of lower order to operate independently within a higher-order DOM Multiplication gate.

In a more general context, a DOM Multiplication of order M can simultaneously perform k DOM Multiplications of various orders $N_0, N_1, N_2, \ldots, N_k$ provided $N_0+N_1+N_2+\ldots+N_k+k \leq M+1$. Achieving this involves deactivating the internal gates for every cross-domain computation external to the shares of each lower-order DOM Multiplication, as previously discussed.

A notable use-case of this invention is when the order of the lower-order multiplication operation is zero. Here, an unprotected multiplication operation occurs within a side-channel protected DOM Multiplication. This becomes advantageous when handling public data that does not necessitate side-channel safeguards.

One prominent cryptographic algorithm employing multiplication operations is the Keccak algorithm. NIST established a SHA-3 suite in FIPS202 that utilizes the Keccak algorithm. The suite encompasses SHAKE128 and SHAKE256 extendable output functions and SHA3-224, SHA3-256, SHA3-384, and SHA3-512 hash functions. Furthermore, SHA-3 derivatives like cSHAKE, KMAC, Tuple-Hash, and ParallelHash are detailed in NIST SP 800-185. While other derivatives of Keccak or SHA-3 might emerge, this invention encompasses any computer processing system using SHA-3, Keccak, or their derivatives, both present and future. It is noteworthy that Keccak employs GF(2') multiplication, signifying that its multiplication can be streamlined to an AND operation, as highlighted earlier.

Figure 3:
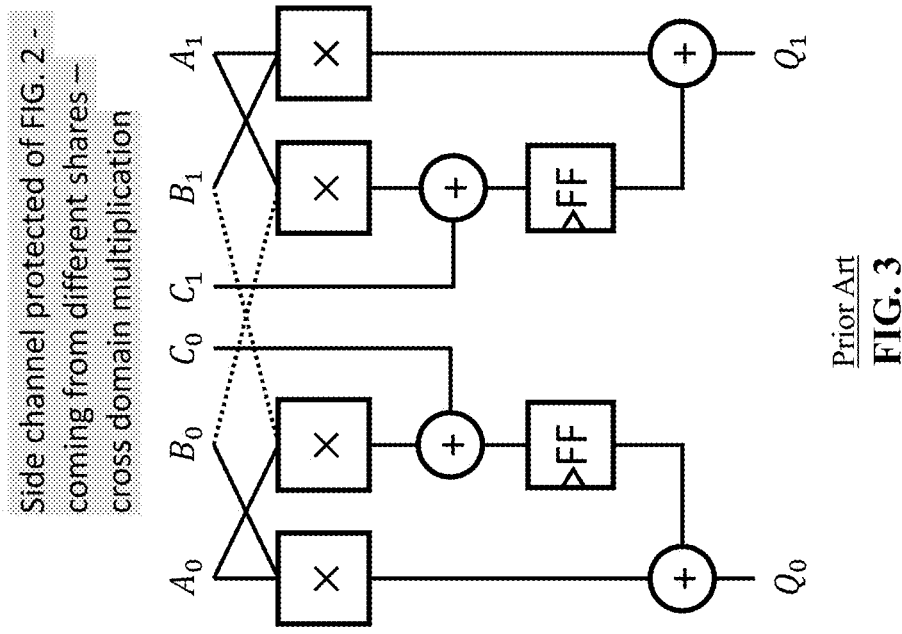
FIG. 3 is a diagram depicting the state-of-the-art or prior art first-order masking DOM Multiplication gate.
Figure 4:
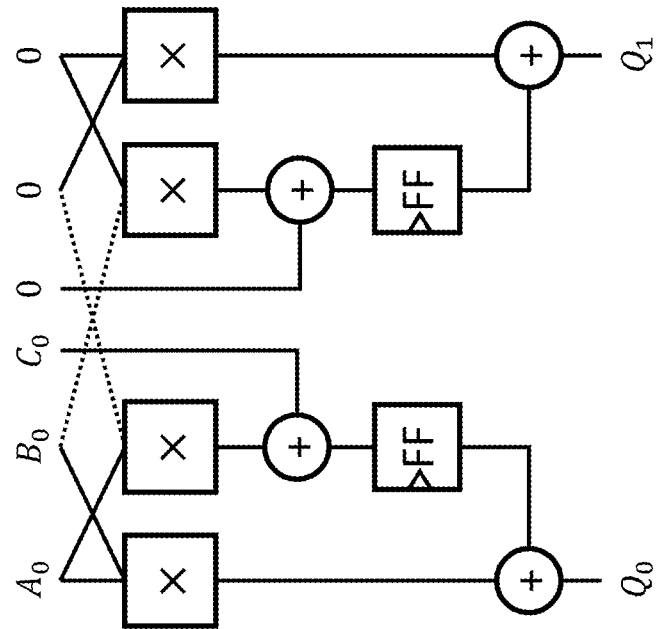
FIG. 4 is a diagram depicting a prior art nuanced variation of the DOM Multiplication gate from FIG. 3.

FIGS. 3-7 illustrate background and support the present invention and for a DOM Multiplication gate of order 1. Specifically, FIG. 3 depicts a conventional DOM Multiplication gate of order 1, wherein resharing employs entirely completely random data denoted as Z. FIG. 4, by contrast, demonstrates a variation of the DOM Multiplication gate of order 1 executing A×B+C. Here, resharing employs $C_0$ and $C_1$, the data shares that symbolize the independent data C.

FIGS. 5-8 exemplify a computer processing system configured to effectuate lower-order masking in a higher-order masked design having a DOM Multiplication gate of order M operably configured to receive M+1 data shares for each of a plurality of variables and operably configured to perform a lower order masking of N, wherein N<M, by disabling at least one cross-domain computation of the M+1 data shares between N+1 data shares and M−N data shares.

Figure 5:
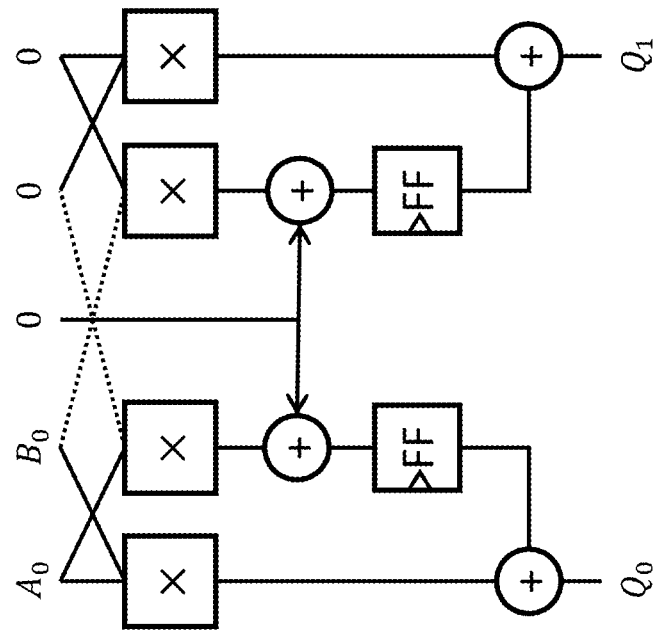
FIG. 5 is a diagram exemplifying a method and system to execute the unprotected operation of A×B (as depicted in FIG. 1) inside the first-order design from FIG. 3 in accordance with one embodiment of the present invention.
Figure 6:
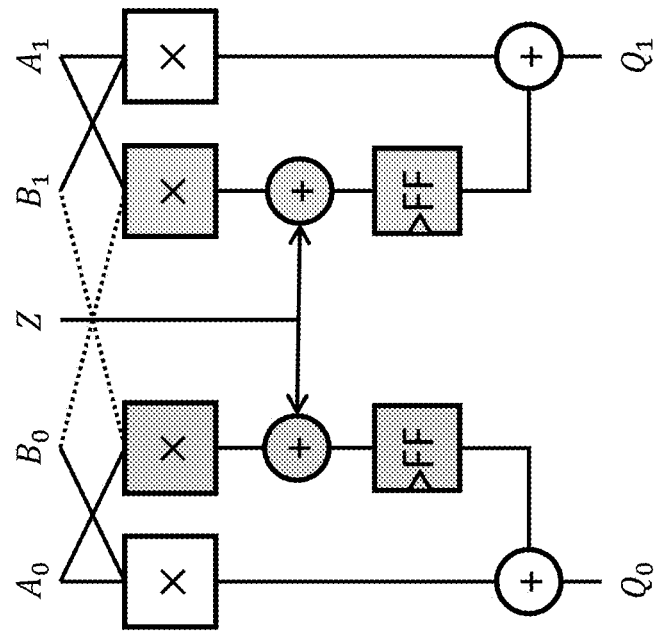
FIG. 6 is a diagram exemplifying another embodiment of the method and system and adhering to a purpose similar to FIG. 5, but tailored for the design of FIG. 4 in accordance with one embodiment of the present invention.

FIG. 5 offers a visualization of the first method of disabling cross-domain computation to execute a zero-order masking operation A×B within the first-order DOM Multiplication gate. This method is achieved by nullifying all inputs of the second share and setting the completely random data Z to zero. To elaborate, zero-order masking makes use of a singular data share, with $A=A_0$ and $B=B_0$ whilst $A_1$, $B_1$, and Z are all set to zero. FIG. 6 elucidates the first approach pertaining to the DOM Multiplication variant that executes A×B+C. Herein, the zero-order masking employ $A=A_0$, $B=B_0$ and $C=C_0$ whilst $A_1$, $B_1$, and $C_1$ are all set to zero. Said another way, FIGS. 5-6 depict zeroing out input of the M−N data shares and zeroing out any completely random data input in the cross-domain computation between N+1 data shares and M−N data shares within the DOM Multiplication gate.

Figure 7:
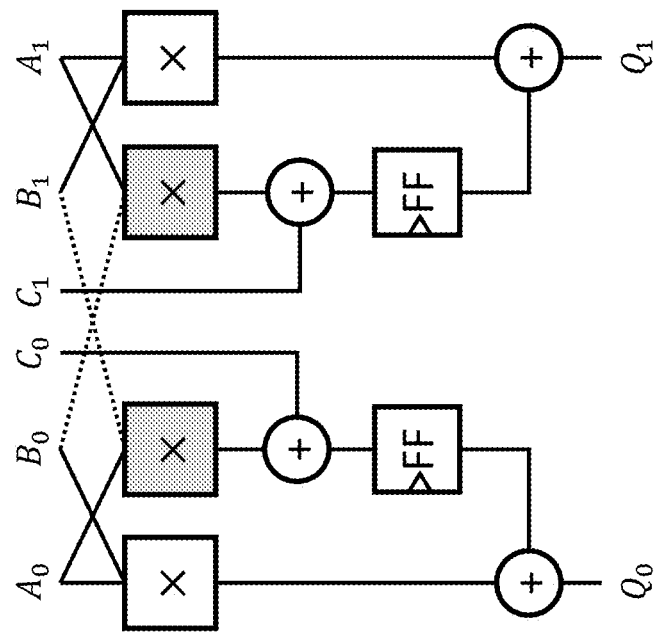
FIG. 7 is a diagram depicting an alternative approach to embed the unprotected operation from FIG. 1 within the first-order design, as demonstrated in FIG. 3 and in accordance with one embodiment of the present invention.
Figure 8:
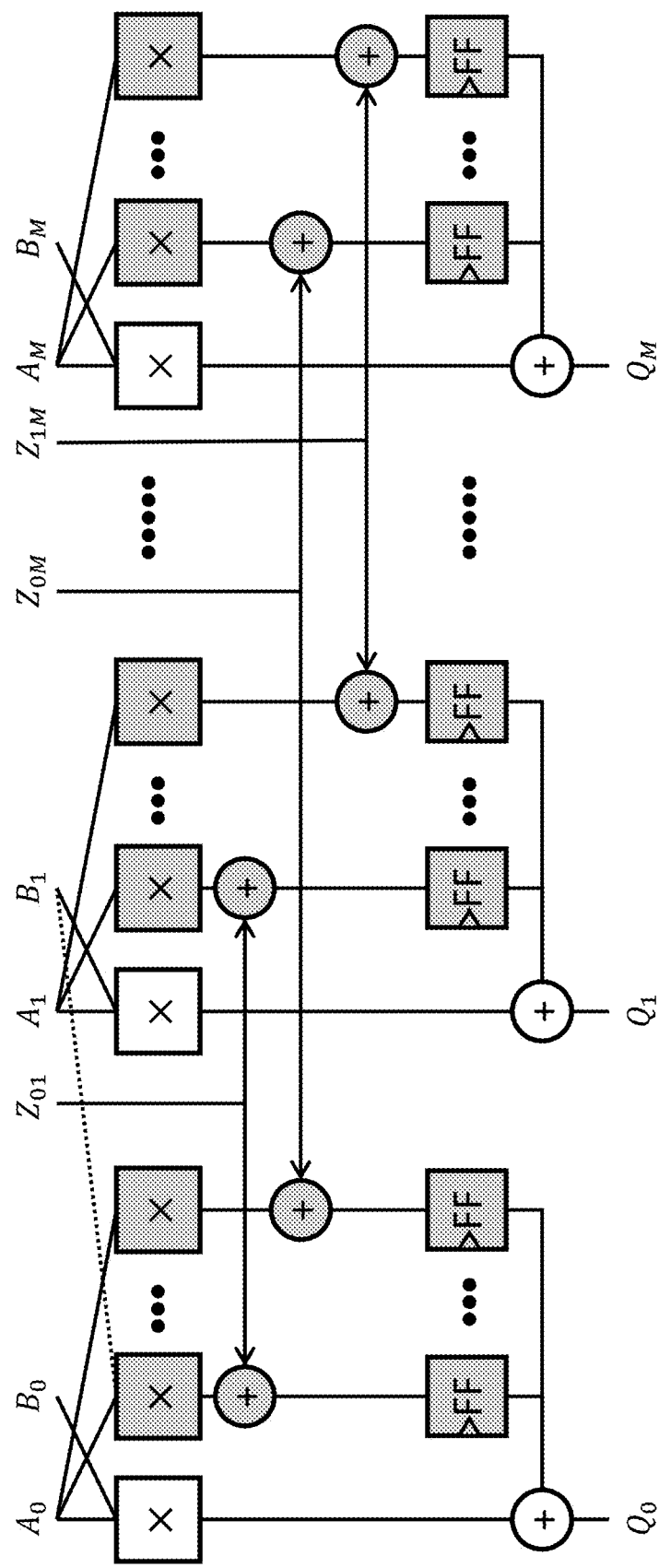
FIG. 8 is a diagram closely mirroring the intent of FIG. 7, but adapted for the design context of FIG. 4 in accordance with one embodiment of the present invention.

FIG. 7 provides insights into the second method of disabling the cross-domain computation to undertake the zero-order masking operation A×B within the first-order DOM Multiplication gate. This method is characterized by disabling the shaded internal gates integral to the cross-domain computation. It is noteworthy that merely disabling a single pathway suffices to execute one zero-order masking, while disabling both pathways facilitates concurrent execution of two zero-order operations. FIG. 8 portrays the secondary method concerning the variant that processes A×B+C. In this scenario, only the multiplication's internal gate warrants disabling. Echoing the principles of FIG. 7, disabling just one pathway is ample for a singular zero-order masking operation. Disabling both paths permits parallel processing of two zero-order operations. Said another way, FIGS. 7-8 depict disabling internal gates configured to perform the at least one cross-domain computation of the M+1 data shares between N+1 data shares and M−N data shares. Furthermore, in one embodiment, the DOM Multiplication gate of the order M is operably configured to perform k lower order maskings of N0, N1, N2, . . . , Nk in parallel such that M+1≥(L+1)=(N0+1)+(N1+1)+(N2+1)+ . . . +(Nk+1) by disabling internal gates configured to perform the at least one cross-domain computation of the M+1 data shares between each of (N0+1), (N1+1), (N2+1), . . . , (Nk+1) and M−L data shares. Still in further embodiments, N is preferably equal to 0 and the computer processing system is configured to perform SHA-3, Keccak, or their respective derivatives.

In conclusion, this invention permits the execution of lower-order masking within a design masked at a higher order, ensuring minimal area expansion. This invention can potentially lead to a decline in power consumption within a computer processing system while performing low-order masking. Moreover, the design paves the way for simultaneous lower-order masking operations to run within a higher-order design.

What is claimed is:

1. A computer processing system configured to effectuate lower-order masking in a higher-order masked design comprising:
   a DOM Multiplication gate of order M operably configured to receive M+1 data shares for each of a plurality of variables and operably configured to perform a lower order masking of N, wherein N<M, by disabling at least one cross-domain computation of the M+1 data shares between N+1 data shares and M−N data shares.

2. The computer processing system according to claim 1, wherein the disabling further comprises:
   zeroing out input of the M−N data shares and zeroing out any completely random data input in the cross-domain computation between N+1 data shares and M−N data shares within the DOM Multiplication gate.

3. The computer processing system according to claim 1, wherein the disabling further comprises:
   disabling internal gates configured to perform the at least one cross-domain computation of the M+1 data shares between N+1 data shares and M−N data shares.

4. The computer processing system according to claim 1, wherein the DOM Multiplication gate of the order M is operably configured to perform k lower order maskings of $N_0$, $N_1$, $N_2$, . . . , $N_k$ in parallel such that M+1≥(L+1)=($N_0$+1)+($N_1$+1)+($N_2$+1)+ . . . +($N_k$+1) by disabling internal gates configured to perform the at least one cross-domain computation of the M+1 data shares between each of ($N_0$+1), ($N_1$+1), ($N_2$+1), . . . , ($N_k$+1) and M−L data shares.

5. The computer processing system according to claim 1, wherein N=0.

6. The computer processing system according to claim 1, wherein the computer processing system is configured to perform SHA-3, Keccak, or their respective derivatives.

7. A computer-implemented method for performing lower-order masking in a higher-order masked design comprising the steps of:
   performing DOM Multiplication operation of order N inside a DOM Multiplication operation of order M inside a computer system; and
   disabling at least one cross-domain computation of the M+1 data shares between N+1 data shares and M−N data shares in the DOM Multiplication operation of order M.

8. The computer-implemented method according to claim 7, further comprising:
   disabling at least one cross-domain computation of the M+1 data shares between N+1 data shares and M−N data shares by zeroing out input of the M−N data shares and zeroing out any completely random data input in the cross-domain computation between N+1 data shares and M−N data shares within the DOM Multiplication operation.

9. The computer-implemented method according to claim 7, further comprising:
   disabling at least one cross-domain computation of the M+1 data shares between N+1 data shares and M−N data shares by disabling internal gates configured to perform the at least one cross-domain computation of the M+1 data shares between N+1 data shares and M−N data shares.

10. The computer-implemented method according to claim 7, further comprising:

performing k DOM Multiplication operations of order $N_0, N_1, N_2, \ldots, N_k$ in parallel such that $M+1 \geq (L+1) = (N_0+1) + (N_1+1) + (N_2+1) + \ldots + (N_k+1)$ by disabling internal gates configured to perform the at least one cross-domain computation of the M+1 data shares between each of $(N_0+1), (N_1+1), (N_2+1), \ldots, (N_k+1)$ and M−L data shares.

11. The computer-implemented method according to claim 7, wherein N=0.

12. The computer-implemented method according to claim 7, further comprising:

performing SHA-3, Keccak, or their respective derivatives in the computer system.

* * * * *